Feb. 2, 1954

G. A. BRETTELL, JR 2,668,240

NONINVERTING OSCILLATOR

Filed Nov. 24, 1943

INVENTOR
GEORGE A. BRETTELL, JR
BY
ATTORNEY

Patented Feb. 2, 1954

2,668,240

UNITED STATES PATENT OFFICE 2,668,240

NONINVERTING OSCILLATOR

George A. Brettell, Jr., Newark, N. J.

Application November 24, 1943, Serial No. 511,626

1 Claim. (Cl. 250—36)

This invention relates to a vacuum tube circuit, and more particularly to a vacuum tube circuit in which the grid and plate potentials are in phase.

It has long been known to those familiar with the art of vacuum tube circuits that if a circuit could be made in which the grid and plate potentials of a tube contained therein, as for example a triode, were in phase instead of 180° out of phase that many new, unique and desirable results could be obtained.

An object of this invention is to produce a circuit in which the grid and plate potentials of a tube contained therein are in phase instead of 180° out of phase.

An object of this invention is to produce a circuit in which the grid and plate potentials of a tube contained therein are in phase without recourse to operation on non-conventional portions of the characteristic curves of the tube.

An object of this invention is to produce an oscillator which utilizes a tube whose grid and plate potentials are in phase; thereby eliminating the necessity of tapping the coil, splitting the condenser and other similar means.

An object of this invention is to produce a single stage amplifier without phase reversal as distinguished from the two cascaded stages required by the prior art; and the resultant difficulty experienced therein with phase shift due to interstage coupling.

An object of this invention is to produce a multivibrator which utilizes a tube whose grid and plate potentials are in phase.

An object of this invention is to produce a relay circuit which utilizes a tube whose grid and plate potentials are in phase.

An object of this invention is to produce an oscillator capable of generating sine waves which utilizes a tube whose grid and plate potentials are in phase.

Another object of this invention is the provision of a circuit utilizing a tube whose grid and plate potentials are in phase which will be economical to manufacture, reliable in operation and which possesses all of the qualities of ruggedness and dependability in service.

Other objects and features will become apparent upon a careful consideration of the following detailed description when taken together with the accompanying drawings, the figures of which are designed for the sole purpose of illustration and not as a definition of the limits of the invention, reference for the latter purpose being had to the appended claims.

In the drawings:

Figure 4b illustrates the voltage across the grid resistor of Figure 4a.

Figure 4c illustrates the voltage across the plate resistor of Figure 4a.

Figure 1A:
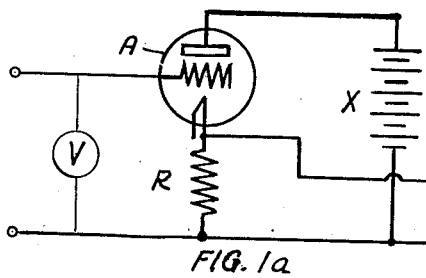
Figures 1a and 1b represent two circuits of the prior art which when combined in accordance with the teachings of this disclosure produce my invention.
Figure 1B:
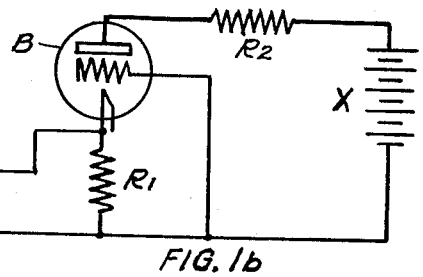

The basic operation of this invention is best illustrated by considering the operation of the circuits of Figures 1a and 1b.

Figure 1a illustrates a cathode loaded amplifier stage in which A is the triode, V the applied voltage or input to the triode, R the cathode resistance across which the load is applied at terminals $T_1$ and X the plate voltage.

In operation assume that a positive output voltage exists at terminals $T_1$. This implies that the current through R has increased in a positive direction or sense. This in turn implies that a net positive voltage has been applied on the grid of triode A relative to its cathode. The input needed to produce this effect is equal to the sum of this net grid voltage and the output voltage. It is to be noted that the output voltage is somewhat smaller than the input (by reason of the required grid excitation) and of the same phase or sense.

Figure 1b shows a cathode driven amplifier stage in which B represents a triode, $R_1$ the cathode resistance across which the input to the triode is delivered to terminals $T_2$, X the battery and $R_2$ the plate resistor.

In operation if a positive voltage is applied at $T_2$, the plate current decreases first by reason that the voltage $T_2$ in effect bucks the supply battery X and second by reason that the grid is made more negative with respect to the cathode. Since a decrease in plate current causes the potential drop across resistor $R_2$ to decrease, the output voltage is seen to be in phase with the input voltage.

The cathode loaded amplifier is an amplifier which has a small voltage loss and it acts mainly as an isolating and impedance reducing amplifier. The cathode driven amplifier is a low input impedance amplifier in which, particularly where the tube is a triode, electrostatic shielding is accomplished by the grid control.

In the two circuits discussed above there is no reversal of signal phase because the output of the circuit of Figure 1a is taken from the cathode resistor R and applied to the cathode resistor $R_1$ of the circuit of Figure 1b. When the two circuits are combined by connecting the terminals $T_1$ and $T_2$ to produce the circuit of Figure 2 there is also no reversal of signal phase.

Figure 2:
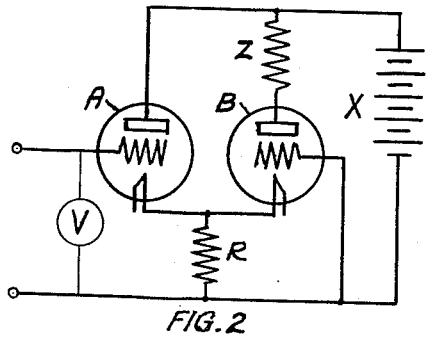
Figure 2 is a diagram of this invention produced by combining the circuits illustrated in Figures 1a and 1b.

In Figure 2 it should be noted that A and B are two triodes as illustrated in Figure 1a and Figure 1b, respectively. Z is the plate load impedance, X the battery, R the cathode resistor, and V the applied voltage. For example, if triodes A and B are identical and have the constants $u=20$, and a plate resistance of 10,000 ohms, the effective constants of the combination shown are $u=13.6$, and the plate resistance equal 17,200 ohms. The combination therefore acts as a triode having these new constants, with the exception that a phase reversal has been effected between the grid and the plate circuits. A conventional triode can be analyzed on the basis of a voltage $-uEg$ in the plate circuit, this new combination acts as if there were a voltage $+uEg$ in the plate circuit.

In operation Figure 2 consists of a cascading of the circuits in Figures 1a and 1b. In each of Figures 1a and 1b, it has been shown that no phase reversal occurs, and therefore no net phase reversal when they are cascaded. The combination of triode A, resistor R and triode B can therefore be regarded as a single triode which differs from a conventional triode only in that no phase reversal exists between the input voltage and the internal voltage, $u$ times as large, generated within the tube. The concept of a series plate resistance in the tube is unaltered. A positive grid voltage on such a tube causes the plate current to decrease rather than increase. In the discussion of the remainder of the figures the combination in Figure 2 may be regarded as this special type of triode and referred to as a non-inverting amplifier.

Figure 3:
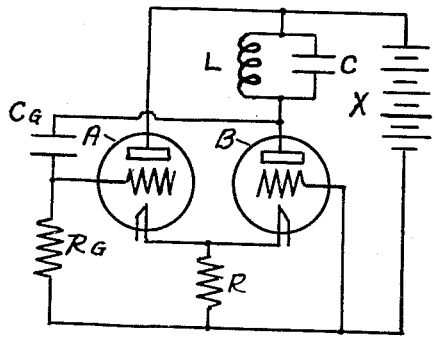
Figure 3 represents an application of this invention in the form of an oscillator.

Figure 3 illustrates the application of this invention to an oscillator. A and B are triodes, L is an inductance, C is a capacitance, X is the battery, R the cathode resistor, $Rg$ the grid resistor and $Cg$ a coupling condenser. $Cg$ and $Rg$ are so proportioned as to present neglible loading and phase shift at the frequency of oscillation and serve only to apply correct grid bias. L and C are the frequency determining elements. The conditions for oscillation are that the absolute value of the negative resistance which the tube combination offers to the tuned circuit be equal to or less than the effective resistance of the tuned circuit when said tuned circuit has unity power factor. The novelty of this circuit resides in the fact that only a two terminal tuned circuit is required and that oscillation is stable and does not depend on critical adjustments, secondary emission, or negative transconductance which latter can be obtained in multigrid tubes over limited ranges.

In operation, Figure 3 presents a type of LC oscillator. This oscillator consists of a non-inverting amplifier which has a shunt resonant circuit as a plate load, and has the control grid coupled directly to the plate. The nature of the plate load impedance will be a function of frequency. At only the resonant frequency will this impedance be a pure resistance. The plate voltage is equal to $ue_gZ/R_p-Z$, where Z is the load impedance and $R_p$ the plate resistance. This relation states that the plate voltage is in phase with the grid voltage only if the plate load is pure resistance and therefore in this instance only at resonant frequency. Since in this circuit the grid is excited directly by the plate, a net phase rotation around the loop will be zero only at the resonant frequency. The net gain around the loop is equal to or greater than unity provided that Z at resonance is equal to or greater than $R_p/u-1$. Under these conditions the circuit will oscillate.

Figure 4B:
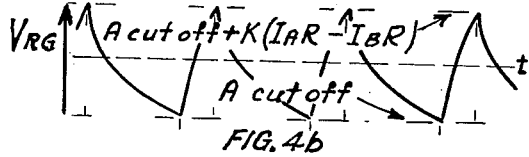
Figure 4C:
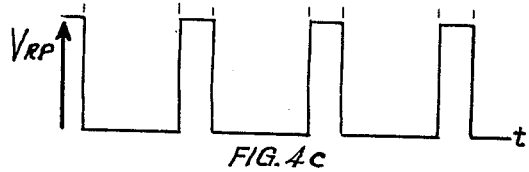
Figure 4A:
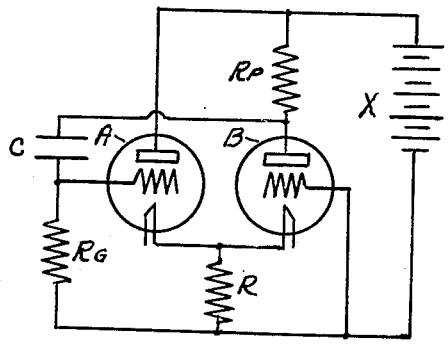
Figure 4a represents an application of this invention in the form of a multivibrator.
Figure 5:
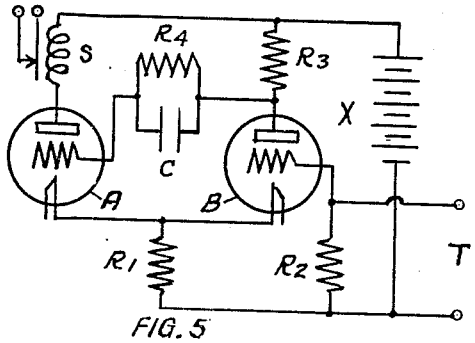
Figure 5 represents a circuit diagram illustrating relay tube action.

In Figure 4a this invention is illustrated as applied to a multivibrator. A and B are triodes, $R_p$ the plate resistance, X the battery, C the coupling condenser, $Rg$ the grid resistor and R the cathode resistor. This circuit will generate a rectangular wave shape in which positive and negative pulses can be independently controlled. This circuit is particularly adapted for use in television receivers to generate the linear sweep voltages for beam deflection. In such an application, the synchronizing signal can be injected to the grid of tube B. The wave shape in this case consists of short duration, flat topped pulses separated considerably in time. By changing this circuit slightly, as illustrated in Figure 5, relay tube action is obtained.

In operation the circuit here shown is a form of multivibrator. Suppose that the grid of tube A rises slightly in potential due to some initial disturbance. This causes the potential of the plate of B to rise, which rise is transmitted to the grid of A making the plate of B rise still further. The action is self accelerating and continues until the plate current to tube B is cut off. In general this state of affairs will exist before the potential of the plate of B has risen to the battery voltage. Therefore condenser C will continue to be charged until the drop across $R_p$ has reached zero. During this interval the current in tube B is zero. At this point the potential of grid A will start to fall due to the charge on C leaking off through $Rg$. As this leaking proceeds tube B starts to draw current again, which means that the potential of the plate of B will drop, and through C carry the grid of A with it in a self-accelerating action. This continues until the plate of B is at the potential corresponding to the cut off condition of the grid of A. In general this condition will find the grid of A considerably below cut off potential. A time interval occurs during which the charge on C leaks off through $Rg$ until the grid regains control, at which time the cyclic process begins again. In gross effect, the plate current of tube B is periodically either a constant value or zero, and since the transition between these two states is rapid, an essentially rectangular wave is generated.

Another way of considering the operation of Figure 4a is that the circuit functions by making tubes A and B alternately, but never concurrently conductive. When tube section A conducts, such a large voltage drop $(I_aR)$ appears across cathode resistor R that the grid of tube section B is effectively negatively biassed so as to cut off conductivity of the latter. At this point the B supply begins to charge up condenser C through resistors $R_p$ and $R_g$. From the viewpoint of the grid of tube section A, this charging appears to be an increase of bias of negative polarity; and when it is great enough to reach the cut off point of this tube section, conductivity thereof ceases. Instantaneously, tube section B becomes conductive and condenser C discharges through the circuit of tube section B in series with $Rg$. The low impedance of this path permits a relatively fast discharge, making the grid potential in tube section A approach cut off and render this tube section A conductive again. This cycle of operation thereafter repeats itself. The reason for an apparent difference between the cut off potential for extinguishing and that for permitting conductivity in tube section A is the difference in potentials set up across the cathode resistor R when tube section A and then tube section B conducts, namely ($I_AR - I_BR$).

This cycle is graphically illustrated in Figures 4b and 4c, in which Figure 4b is a plot of the voltage across resistor $R_g$ as a function of time. Figure 4c represents the output voltage across impedance $R_p$ as a function of the same time scale.

In Figure 5, A and B are the two triodes, $R_1$ is the cathode resistor, $R_2$ the grid resistor, $R_3$ the plate resistor, $R_4$ the grid leak resistor, C the coupling condenser, X the battery, S the relay and T the input terminal. If an impulse is supplied at terminals T and this pulse is positive, the plate current of tube A is interrupted for a predetermined time, depending primarily on the time constant $R_4C$.

The operation of the relay circuit of Figure 5 is similar in action to that of Figure 4a except that it is so arranged that a single pulse of defined duration is generated in response to a triggering pulse on the input circuit. The relay shown at S is to be regarded as representative of some output load. Its presence or absence is not to be regarded as affecting the circuit. It merely serves to translate a change in plate current to some usable type of information.

In the standby condition tube A has effectively zero bias on it since a small current continues to flow to it through resistor $R_4$. The plate current of tube A is a maximum and is of sufficient strength so that the drop it occasions across resistor $R_1$ serves to bias tube B beyond cut off.

Suppose that a positive pulse is applied at T. This causes tube B to conduct momentarily and therefore causes the plate potential of B to drop. This drop is, however, instantly communicated to grid A through condenser C thus causing the drop across $R_1$ to decrease and allowing plate current to flow in tube B even without the continued presence of a pulse at T. This self-accelerating action continues and takes grid A well into a cut off region thus extinguishing the plate current in tube A. This quasi-steady state condition continues until the charge on condenser C has leaked off through $R_4$ to the point where tube A will start to conduct. The action now accelerates in the other direction until the original conditions are reestablished. It is presumed that the pulse at T has by this time disappeared.

Figure 6:
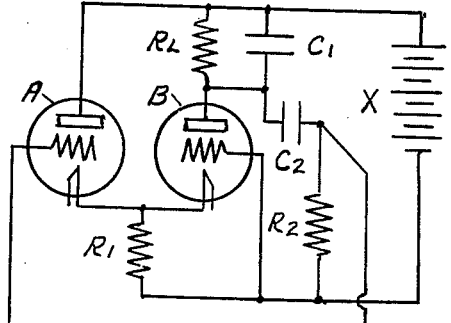
Figure 6 represents the application of this invention in the form of an oscillator capable of generating sine waves.

The circuit illustrated in Figure 6 shows an oscillator capable of generating sine waves. A and B again are triodes, $R_1$ is the cathode resistor, $R_2$ the grid resistor, $R_L$ the plate resistor, $C_1$ the plate condenser, $C_2$ a condenser mounted as shown and X the battery. Condenser $C_1$ in combination with $R_L$ and the plate resistance of the tube causes the phase of $u_{eg}$ to lag, $C_2$ in combination with $R_2$ causes the phase of $u_{eg}$ to be rotated back to zero at one particular frequency only. If the tube gain is greater than the network transmission loss, oscillation will take place at the fore-mentioned frequency.

The operation of this type of RC oscillator requires the conditions for oscillation such that the phase shift around the loop at the frequency in question is zero, and that the net gain is not less than unity. The presence of $C_1$ in shunt with the plate load resistance causes the plate voltage to lag the grid voltage. Coupling condenser $C_2$ is so proportioned that at the desired frequency it introduces an equal lead of grid voltage ahead of plate voltage. The net phase shift is thus seen to be zero. If it is zero at a specified frequency, it can be readily demonstrated that for the configuration shown it is zero at only that frequency. It can as readily be shown that the attenuation introduced by the network $R_L$, $C_1$, $C_2$, $R_2$ can be more than compensated for by the gain of the non-inverting amplifier, and the net gain therefore be made greater than unity, thus fulfilling the conditions for oscillation.

As stated in the beginning of the specification, the primary purpose of this invention is a circuit which does not invert the phase between grid and plate potentials. The applications which have been illustrated here are to serve as examples only. The combination proves equally effective in other types of tubes such as pentodes, etc., as will be obvious to those skilled in the art. The concrete examples chosen, i. e. triodes; have been selected partly because they are typical of other types, and partly because, at the present time, two triodes built into one envelope are readily available commercially.

It will also be noted that this disclosure shows some unique elements in other than the basic circuit, but these novelties follow immediately from the possibilities of the basic circuit, and are shown here merely as illustrations. The primary device is that illustrated in Figure 2 and the modifications are not to be taken as limiting the invention, but as examples of what the design may be made to accomplish.

I claim:

A sine wave generator including a non-inverting amplifier comprising, means for combining a cathode loaded amplifier section with a cathode driven amplifier section to form a non-inverting amplifier, means forming a resistance-capacity coupled feedback branch from the plate of the second section to the grid of the first section, and means in the plate circuit of the second section to cause the phase shift of the voltage on the plate of said second section with relation to the voltage on the grid of the first section at the specified frequency to be zero, said last-named means comprising a paralleled capacitance and load resistance in series with the plate of said second section to compensate for the phase shift introduced by said resistance-capacity feedback branch.

GEORGE A. BRETTELL, JR.

References Cited in the file of this patent

UNITED STATES PATENTS

| Number | Name | Date |
|---|---|---|
| 2,050,059 | Koch | Aug. 4, 1936 |
| 2,246,331 | White | June 17, 1941 |
| 2,266,668 | Tubbs | Dec. 16, 1941 |
| 2,269,417 | Crosby | Jan. 6, 1942 |
| 2,275,016 | Koch | Mar. 3, 1942 |
| 2,276,565 | Crosby | Mar. 17, 1942 |
| 2,300,996 | Vanderlyn et al. | Nov. 3, 1942 |
| 2,324,314 | Michel | July 13, 1943 |
| 2,444,084 | Artzt | June 29, 1948 |

FOREIGN PATENTS

| Number | Country | Date |
|---|---|---|
| 861,809 | France | Nov. 12, 1940 |